US011461470B2

(12) United States Patent
Ahuja (10) Patent No.: US 11,461,470 B2
(45) Date of Patent: Oct. 4, 2022

(54) SYSTEM AND METHOD FOR PROVIDING AN APPLICATION PROGRAMMING INTERFACE (API) BASED ON PERFORMANCE AND SECURITY

(71) Applicant: Bank of America Corporation, Charlotte, NC (US)

(72) Inventor: Neelofar Ahuja, Warwick, PA (US)

(73) Assignee: Bank of America Corporation, Charlotte, NC (US)

( * ) Notice: Subject to any disclaimer, the term of this patent is extended or adjusted under 35 U.S.C. 154(b) by 323 days.

(21) Appl. No.: 16/913,475

(22) Filed: Jun. 26, 2020

(65) Prior Publication Data

US 2021/0406383 A1 Dec. 30, 2021

(51) Int. Cl.
*G06F 21/57* (2013.01)
*G06F 9/54* (2006.01)

(52) U.S. Cl.
CPC ............ *G06F 21/577* (2013.01); *G06F 9/547* (2013.01); *G06F 2221/033* (2013.01)

(58) Field of Classification Search
CPC .............................. G06F 21/577; G06F 9/547
USPC ......................................................... 726/25
See application file for complete search history.

(56) References Cited

U.S. PATENT DOCUMENTS

| 6,510,550 | B1 | 1/2003 | Hightower et al. |
| 6,591,417 | B1 * | 7/2003 | Strysniewicz ............ G06F 8/65 717/173 |
| 6,732,118 | B2 | 5/2004 | Hermann et al. |
| 6,907,519 | B2 | 6/2005 | Desoli |
| 7,243,355 | B2 | 7/2007 | Espino |
| 7,277,431 | B2 | 10/2007 | Walter et al. |
| 7,426,737 | B2 | 9/2008 | Hellenthal et al. |
| 7,721,276 | B2 | 5/2010 | Lwo |
| 7,814,544 | B1 | 10/2010 | Wilhelm |
| 8,131,739 | B2 | 3/2012 | Wu et al. |
| 8,423,963 | B2 | 4/2013 | Garbers et al. |
| 8,499,358 | B2 | 7/2013 | Murakami et al. |
| 8,645,936 | B2 | 2/2014 | Mahajan |
| 8,776,011 | B2 | 7/2014 | Sharma et al. |
| 8,793,359 | B1 * | 7/2014 | Fiebig ................. G06F 11/3003 719/313 |
| 8,863,156 | B1 * | 10/2014 | Lepanto .............. G06F 9/44521 719/328 |
| 8,868,540 | B2 | 10/2014 | Ture et al. |

(Continued)

FOREIGN PATENT DOCUMENTS

| EP | 2871574 A1 | 5/2015 |
| WO | 2006099046 A2 | 9/2006 |

*Primary Examiner* — Dant B Shaifer Harriman (57) ABSTRACT

A system is configured for determining an API to perform a task includes a processor configured to receive a request from a user to determine an API to perform the task. The input and output parameters of the API are determined. A set of APIs is determined from an API library that is capable of providing the output parameter given the input parameter. Each API from among the set of APIs is evaluated by determining a quality value; a security value, and a performance value of the API. An API score value is determined based on a combination of the quality value, the security value, and the performance value of the API. A particular API having an API score value that is the highest compared to other APIs from among the set of APIs is determined. The particular API is hosted on a web application to perform the task.

20 Claims, 3 Drawing Sheets

(56) References Cited

U.S. PATENT DOCUMENTS

| | | |
|---|---|---|
| 9,003,541 B1 | 4/2015 | Patidar |
| 9,235,704 B2 | 1/2016 | Wootton et al. |
| 9,258,274 B2 | 2/2016 | Hansen |
| 9,280,686 B1 | 3/2016 | Fuller et al. |
| 9,396,091 B2 * | 7/2016 | Bally ............... G06F 11/3684 |
| 9,448,859 B2 | 9/2016 | Gathala et al. |
| 9,454,409 B2 * | 9/2016 | Laredo ............... G06Q 10/06 |
| 9,729,506 B2 * | 8/2017 | Call ............... H04L 63/101 |
| 9,916,475 B2 | 3/2018 | Enck et al. |
| 9,965,337 B2 | 5/2018 | Laredo et al. |
| 10,050,935 B2 | 8/2018 | Hansen |
| 10,133,650 B1 | 11/2018 | Park et al. |
| 10,250,592 B2 | 4/2019 | Malatesha et al. |
| 10,310,850 B2 | 6/2019 | Duppenthaler et al. |
| 10,585,727 B1 | 3/2020 | Bolton et al. |
| 10,628,243 B1 | 4/2020 | Cramer et al. |
| 10,990,702 B1 * | 4/2021 | Hinrichs ............... G06F 16/185 |
| 11,204,862 B2 * | 12/2021 | Wang ............... G06F 11/3692 |
| 11,212,310 B2 * | 12/2021 | Arvanites ............... G06F 16/951 |
| 11,245,728 B1 * | 2/2022 | Curtis ............... H04L 63/101 |
| 11,258,824 B1 * | 2/2022 | Hinrichs ............... H04L 63/20 |
| 11,263,321 B2 * | 3/2022 | Subbarayan ............... G06F 9/54 |
| 11,301,357 B1 * | 4/2022 | Gacek ............... G06F 11/323 |
| 2003/0126310 A1 | 7/2003 | Ryzhov |
| 2005/0188356 A1 | 8/2005 | Lwo |
| 2006/0037064 A1 | 2/2006 | Jeffries et al. |
| 2006/0156314 A1 * | 7/2006 | Waldorf ............... G06F 9/4484 |
| | | 712/E9.082 |
| 2007/0061731 A1 | 3/2007 | Dillon et al. |
| 2007/0288897 A1 | 12/2007 | Branda et al. |
| 2007/0294662 A1 | 12/2007 | Kim et al. |
| 2008/0082569 A1 | 4/2008 | Mansour et al. |
| 2008/0209451 A1 * | 8/2008 | Michels ............... G06F 15/16 |
| | | 719/328 |
| 2010/0235823 A1 * | 9/2010 | Garbers ............... G06F 8/71 |
| | | 717/170 |
| 2011/0078674 A1 * | 3/2011 | Ershov ............... G06F 8/75 |
| | | 717/170 |
| 2013/0061211 A1 * | 3/2013 | Rama ............... G06F 8/73 |
| | | 717/126 |
| 2014/0237595 A1 | 8/2014 | Sridhara et al. |
| 2015/0381580 A1 | 12/2015 | Graham, III et al. |
| 2016/0335131 A1 | 11/2016 | Goh et al. |
| 2016/0352867 A1 | 12/2016 | Subbarayan et al. |
| 2017/0371937 A1 * | 12/2017 | Shah ............... G06F 8/71 |
| 2018/0019984 A1 | 1/2018 | Isaacson et al. |
| 2018/0115578 A1 | 4/2018 | Subbarayan et al. |
| 2019/0004873 A1 * | 1/2019 | Liu ............... G06F 16/90335 |
| 2019/0034199 A1 * | 1/2019 | Pollock ............... G06F 8/73 |
| 2019/0149424 A1 * | 5/2019 | O'Neill ............... H04L 41/14 |
| | | 709/224 |
| 2021/0233126 A1 * | 7/2021 | Weerapurage ...... H04L 41/5051 |
| 2021/0303454 A1 * | 9/2021 | Wang ............... G06F 9/54 |
| 2021/0365571 A1 * | 11/2021 | Sandall ............... G06F 21/53 |

\* cited by examiner

SYSTEM AND METHOD FOR PROVIDING AN APPLICATION PROGRAMMING INTERFACE (API) BASED ON PERFORMANCE AND SECURITY

TECHNICAL FIELD

The present disclosure relates generally to APIs data processing, and more specifically to a system and method for providing an API based on performance and security.

BACKGROUND

In an organization, there may be hundreds of APIs available to developers within the organization to perform a particular task, such as accessing and retrieving specific data from a server of the organization. Typically, the developers of the organization receive the API information, such as security information of a particular API through emails, which poses a risk of exposure of the security information of the particular API. Furthermore, the developers of the organization may not have the knowledge of every API capable of performing the particular task that are available in the organization. For example, there may be several APIs available in the organization with different response times in performing the particular task. The developers may not have a knowledge of an API capable of performing the particular task with the shortest response time.

SUMMARY

In one embodiment, a system for determining an application programming interface (API) to perform a particular task is disclosed. The system includes a memory that is operable to store an API library including a plurality of APIs. The system also includes a processor that is configured to receive a request from a user to determine an API to perform the particular task. In one example, the particular task may be retrieving data from a server. The processor determines a set of parameters of the API, including input parameters and output parameters. The processor identifies a set of APIs from the API library that are capable of providing the output parameter given the input parameter. The processor evaluates each API from among the set of APIs by determining a quality value of the API by evaluating a quality associated with source code of the API; determining a security value of the API by evaluating a security associated with the source code of the API; and determining a performance value of the API by evaluating a performance of the API. The processor determines an API score value based at least in part upon a combination of the quality value, the security value, and the performance of the API. Based on evaluating each API from among the set of APIs, the processor determines a particular API having an API score value that is the highest compared to other APIs from among the set of APIs. The processor hosts the particular API in a web application to perform the particular task.

Existing API management technologies in choosing an API to perform the particular task lack performing a comprehensive analysis of the available APIs in terms of their quality, security, and performance; and selecting a particular API with an overall better quality, security, and performance compared to other available APIs in the organization. The lack of performing a comprehensive analysis of the available APIs within the organization degrades the performance of the particular task. For example, without a comprehensive analysis of the available APIs within the organization, a developer may select an API that does not have a high performance, quality, and/or security compared to other APIs within the organization. The lack of performing a comprehensive analysis of the available APIs within the organization also causes a risk of exposure of security information of the APIs. For example, without a system that evaluates the available APIs within the organization and selects a particular API to perform a particular task, the developers may receive the security information of the particular API via email which poses a risk of exposure of security information of the particular API. The lack of performing a comprehensive analysis of the available APIs within the organization also causes a risk of exposure of confidential data stored in the server of the organization. For example, without performing a comprehensive analysis of the available APIs within the organization, a developer may use a less secured API to retrieve confidential data from a server of the organization, which makes the confidential data vulnerable to be exposed or leaked via cyberattacks to a third party.

Certain embodiments of this disclosure provide unique solutions to technical problems of existing API management technologies, including those problems described above. For example, the disclosed system provides several technical advantages, which include: 1) selecting a particular API with higher quality, security, and performance from among a plurality of APIs capable of performing a particular task; 2) providing a more secure method of using the particular API to perform the particular task, in which the security information of the API is not delivered on to developers through less secure methods such as through emails; and 3) facilitating to secure confidential data that is being retrieved by the particular API from a database.

As such, this disclosure may improve the underlying function of API management technologies by performing a comprehensive analysis of the available APIs (within an organization) and recommending a particular API with a higher quality, security, and performance compared to other available APIs (within the organization). Accordingly, the disclosed system provides a practical application of managing the APIs within an organization. This, in turn, provides the additional practical application of an improvement in performing a particular task by recommending the particular API. The disclosed system also provides an additional practical application of improving the security of performing the particular task (e.g. retrieving the confidential data from servers) by using the particular API. Thus, by improving the security of retrieving the confidential data from servers that may pose a security vulnerability, the security and operation of those servers may also be improved.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
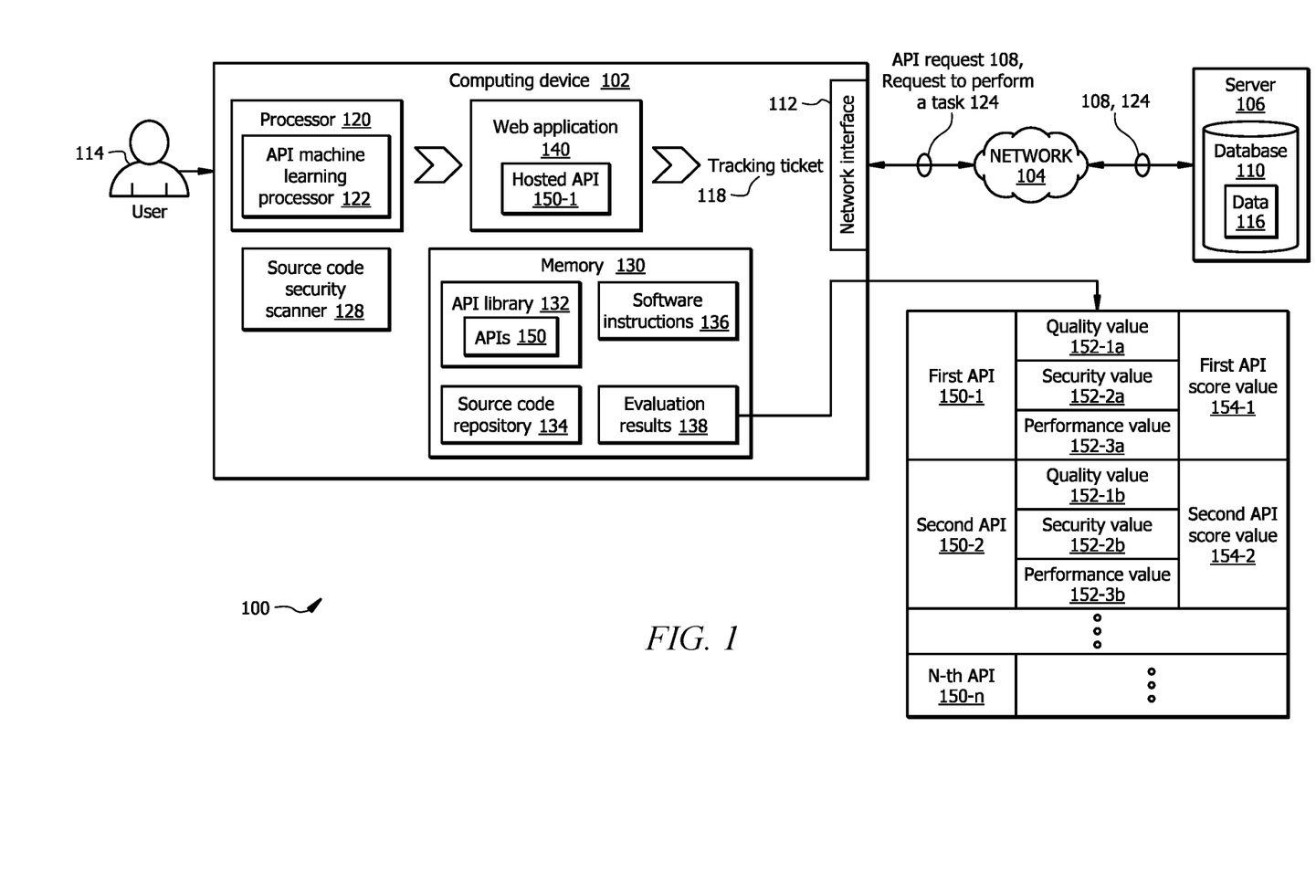
FIG. 1 illustrates one embodiment of a system configured to determine an API to perform a particular task.

FIG. 1 illustrates one embodiment of a system 100 configured to determine an API 150 to perform a particular task 124. In one embodiment, the system 100 comprises a computing device 102 that includes processor 120 in signal communication with a memory 130 and a network interface 112. Memory 130 includes software instructions 136 that when executed by the processor 120 cause the computing device 102 to perform one or more functions described herein. Memory 130 also includes API library 132 that comprises a plurality of APIs 150 programmed to perform different tasks 124. Memory 130 also includes a source code repository 134 that comprises source codes of the APIs 150. The API library 132 and source code repository 134 provides information that may be used by software instructions 136 and/or processor 120. In one embodiment, the processor 120 includes an API machine learning processor 122. In other embodiments, system 100 may not have all of the components listed and/or may have other elements instead of, or in addition to, those listed above.

In general, the system 100 improves the API management technologies by performing an analysis of APIs 150 available in the API library 132 and recommending a particular API 150 that has a higher API score value 154 compared to other APIs 150 to perform the particular task 124. The system 100 also improves the security of performing the particular task 124 (e.g. retrieving data 116 from server 106) by using the particular API 150.

Network interface 112 is configured to enable wired and/or wireless communications. The network interface 112 is configured to communicate data between the computing device 102 and other devices, systems, or domain(s). For example, the network interface 112 may comprise a WIFI interface, a local area network (LAN) interface, a wide area network (WAN) interface, a modem, a switch, or a router. The processor 120 is configured to send and receive data using the network interface 112. The network interface 112 may be configured to use any suitable type of communication protocol as would be appreciated by one of ordinary skill in the art.

Processor 120 comprises one or more processors operably coupled to network interface 112, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 136) to implement the API machine learning processor 122. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-3. For example, the processor 120 may be configured to perform the steps of method 200 as described in FIG. 2.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the API library 132, source code repository 134, software instructions 136, evaluation results 138, and/or any other data or instructions. The API library 132, source code repository 134, software instructions 136, and evaluation results 138 may comprise any suitable set of instructions, logic, rules, or code operable to execute the processor 120. The API library 132, source code repository 134, software instructions 136, and evaluation results 138 are described in more detail below.

Computing device 102 is generally any computing device configured to communicate with other computing devices, servers, etc. through the network interface 112 via network 104. The computing device 102 is configured to perform specific functions described herein and interact with users 114, e.g., via user interfaces. Examples of the computing device 102 include but not limited to desktop computers, mobile phones, tablet computers, laptop computers, servers, etc. In one embodiment, the computing device 102 may be associated with an organization. For example, a user 114 may be a developer within the organization, and the computing device 102 may be a desktop computer that the user 114 uses to request to perform the task 124. In some examples, task 124 may be requesting to retrieve data 116 from server 106. For example, task 124 may be requesting to retrieve email addresses of the clients of the organization stored in the server 106. Server 106 is generally any server that is configured to communicate with other servers, computing devices, etc. via network 104. The server 106 is also associated with the organization. The server 106 may include a database 110 configured to maintain data 116 that includes data related to clients or users of the organization.

Web application 140 is generally any software or web application that enables the user 114 to invoke the API 150. The web application 140 is configured to perform specific tasks and interact with users 114 via an interface. For example, the web application 140 may be a web application on a web site of the organization with username/password fields and an interface to allow the users 114 to invoke the API 150. When the user 114 logs in to his/her organization account, the web application 140 enables the user 114 to access the interface to invoke the API 150 and send an API request 108 to server 106 to receive data 116.

API 150 is a computing interface by which multiple web applications 140, computing devices 102, and/or server 106 interact with each other. Typically, APIs 150 are used to establish a communication between the computing device 102 and the server 106. In one example, the user 114 may wish to retrieve data 116 from server 106. In order to retrieve data 116, user 114 needs to use an API 150 to communicate with the server 106, by sending an API request 108 to the server 106. The API 150 may be hosted or deployed in a software or web application 140 to provide an interface to users 114 to communicate with servers 106. The API 150 is hosted or deployed in the software application when the API 150 is invoked or executed in the interface of the web application 140.

In one example, an API 150 may include a query statement (e.g., SQL, MySQL, etc.) with input and output parameters. Thus, the users 114 (such as developers within the organization) may specify the input and output parameters of the API 150 in the query statement. For example, consider an API 150 to retrieve the phone numbers of clients of the organization for clients with client IDs from 100 to 110. A query statement for the API 150 in this particular example may be, such as: SELECT phone numbers from clients WHERE client ID is from 100 to 110. When the user 114 invokes this particular API 150, the API 150 generates the API request 108 based on the query statement of the API 150. The API request 108 for this particular API 150, maybe such as: https://api.organization.com/search/output=phone_numbers&input=client_ID_from100to110. The user 114 may also copy this API request 108 in a web browser.

Typically, an API 150 is associated with a security mechanism to authenticate the API call or API request 108 sent from the computing device 102 to server 106; and to secure retrieving data 116 from the server 106 to computing device 102. The purpose of associating the security mechanism to the API 150 is to allow access on "need to have access basis" based on proper authentication procedures. The security mechanism associated with the API 150 enables properly identifying entities such as users 114, unauthorized entities, etc. that are attempting to invoke the API 150 and access the data 116. The security mechanism facilitates that unauthorized entities not be able to invoke the API 150 and/or intercept the API request 108 to access and retrieve the data 116. More details of security mechanisms in APIs 150 are described in conjunction with the source code security scanner 128. Example security mechanisms include HTTP basic access Authentication, Token-based Authentication, etc. In the example of the Token-based Authentication, a token is a string of numbers, alphabets, symbols, etc. that is randomly generated for each API request 108. In a particular API request 108, a unique token is generated e.g., by an authorization server, when the user 114 invokes the API 150 and initiates the API request 108 through web application 140. The unique token is shared between the user 114 and server 106 by the authorization server. The authorization server is generally a third-party server such as Open-access Authorization (OAuth) server, etc. that are configured to generate tokens when a user 114 invokes an API 150. When the user 114 sends the API request 108 to server 106, the server 106 checks whether the token for this API request 108 matches the token previously shared with server 106. If the token used in the API request 108 is valid and matches the token previously shared with server 106, server 106 authenticates the API request 108 and returns the requested data 116. For example, consider a case where the user 114 wishes to retrieve email addresses of clients of the organization with client IDs from 100 to 110. In this case, the API 150 generates and sends an API request 108, such as below, to the server 106. https://api.organization.com/search/output=email_address&client_IDs=from 100to110&token=0 8527983h87$%643, where the token is appended to the API request 108. Once the server 106 receives this exemplarily API request 108, it checks whether the token matches the token previously shared with server 106. If they match, the server 106 returns the email address of clients with mentioned client IDs in the API request 108. In some examples of security mechanisms, once the server 106 receives the API request 108, it requests a username and a password of the user 114 who initiated the API request 108; and if the username and password of the user 114 is correct (based on credentials of the user 114 stored in server 106), the server 106 checks whether the token of the API request 108 is valid.

API Machine Learning Processor

API machine learning processor 122 may be implemented using software instructions 136 executed by the processor 120, and is configured to determine a particular API 150-1 to send the API request 108 to perform a particular task 124. In some embodiments, the API machine learning processor 122 may include a plurality of neural networks, machine learning, deep learning structures, and/or the like that are programmed by the software instructions 136. The API machine learning processor 122 is configured to recommend or select the particular API 150-1 from among a set of APIs 150 stored in API library 132 based on the quality, security, and performance associated with each API 150. Throughout this process, the API machine learning processor 122 evaluates each API 150 from among the set of APIs 150 in terms of quality, security, and performance associated with the APIs 150. The API machine learning processor 122 then generates the evaluation results 138 based on evaluating the APIs 150.

In some embodiments, the API machine learning processor 122 may host the particular API 150-1 in the web application 140 by invoking the particular API 150-1 in the interface of the web application 140. Thus, when the user 114 interacts with the web application 140 and wishes to perform a particular task 124 (e.g., retrieving data 116 from server 106), the particular API 150-1 is used in sending the API request 108 to the server 106 and retrieving the data 116. Details of the operation of the API machine learning processor 122 is described in conjunction with the operation flow illustrated in FIG. 2.

Figure 2:
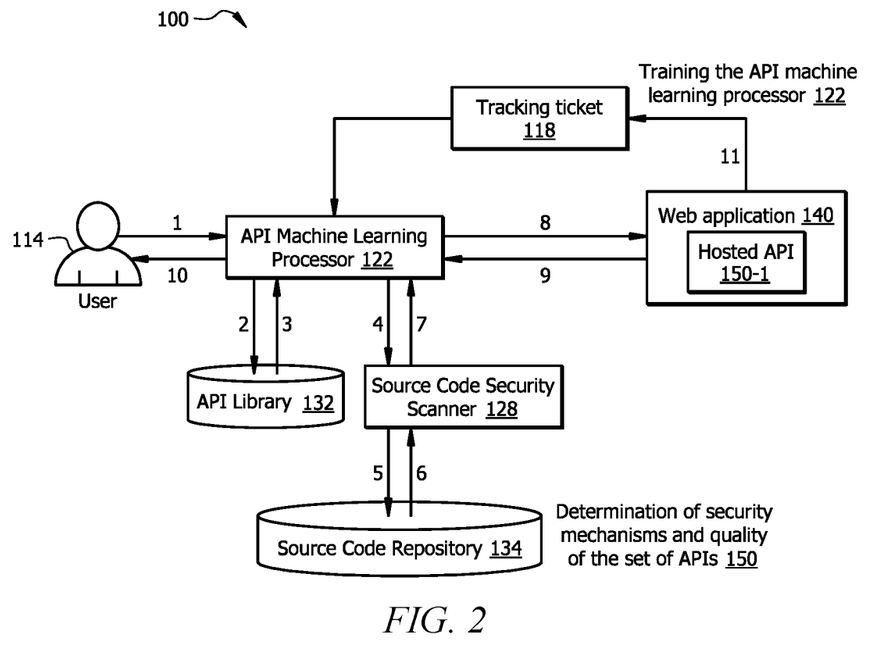
FIG. 2 illustrates one embodiment of an operational flow of the system depicted in FIG. 1.

FIG. 2 illustrates the operational flow of the system 100 depicted in FIG. 1. As illustrated in FIG. 2, the operational flow of the system 100 begins when the user 114 sends the request to the API machine learning processor 122 to determine an API 150 to perform a particular task 124. When the user 114 wishes to choose an API 150 to perform a task 124, he/she feeds the input parameters and output parameters for the API 150 to the API machine learning processor 122, e.g., via a user interface of the API machine learning processor 122. The API machine learning processor 122 determines a set of APIs 150 from the API library 132 that are programmed and capable of performing the task 124. The API library 132 may include information about the APIs 150, such as whether they are programmed and capable of performing different tasks 124.

The API machine learning processor 122 then passes the set of APIs 150 that are programmed and capable of performing the task 124 to the source code security scanner 128 to evaluate quality and security associated with them. Details of the operation of the source code quality scanner 128 are described below in conjunction with the source code quality scanner 128. The source code quality scanner 128 returns the quality and security information associated with the set of APIs 150 to the API machine learning processor 122. The API machine learning processor 122 then determines quality values 152-1 and security values 152-2 of the set of APIs 150, based on the quality and security information associated with the set of APIs 150, respectively. The API machine learning processor 122 may store the quality values 152-1 and security values 152-2 of the set of APIs 150 in the evaluation results 138. (See FIG. 1.)

The API machine learning processor 122 then invokes each API 150 from among the set of APIs 150 to performs the particular task 124. By doing so, the API machine learning processor 122 determines the performances associated with the APIs 150. The API machine learning processor 122 then determines performance values 152-3 based on the performances of the set of APIs 150. Throughout this process, the API machine learning processor 122 hosts each API 150 from the set of APIs 150 in the web application 140 to perform the particular task 124, such as retrieving the data 116 from the server 106. The API machine learning processor 122 then determines a response time of each API 150 while performing the particular task 124. In one embodiment, the response time of each API 150 indicates the performance of each API 150, which is represented by the performance value 152-3. The API machine learning processor 122 may store the performance value 152-3 associated with the set of APIs 150 in the evaluation results 138. (See FIG. 1.) If an API 150 has the shortest response time from among the set of APIs 150 (i.e., if an API 150 performs the particular task 124 faster than other APIs 150), the API machine learning processor 122 determines that the API 150 has the highest performance value 152-3 compared to other APIs 150.

The API machine learning processor 122 then determines an API score value 154 for each API 150 from among the set of APIs 150 based on a combination of the quality value 152-1, security value 152-2, and performance value 152-3 of each API 150 from among the set of APIs 150. The API machine learning processor 122 determines a particular API 150-1 that has the highest API score value 154 compared to other APIs 150 to perform the task 124. The API machine learning processor 122 hosts the particular API 150-1 in the web application 140 present on the web site of the organization to perform the particular task 124.

The API machine learning processor 122 is also configured to monitor the hosted API 150-1 performing the task 124, by e.g., generating a tracking ticket 118 (such as a Jira ticket, and/or the like) and enquiring experiences of the users 114 using the particular API 150-1. The tracking ticket 118 may include a survey or a questionnaire that is aimed for the user 114 who will be using the particular API 150-1. The tracking ticket 118, such as Jira ticket, is used to get feedback from users 114 in using the particular API 150-1. The tracking ticket 118 may include questions to track the quality, security, and performance of the particular API 150-1 while users 114 use the particular API 150-1 in their projects. A separate tracking ticket 118 may be generated and sent to different users 114, every time a user 114 invokes the particular API 150-1 in his/her project. For example, when a user 114 invokes the particular API 150-1, a tracking ticket 118 is generated and sent to the user 114 to report how the particular API 150-1 has performed. The user 114 may report the actual quality, security, and performance of the particular API 150-1 in his/her project in the tracking ticket 118.

For example, the user 114 may indicate in the tracking ticket 118 that the particular API 150-1 does not accept a specific output format. Thus, the source code of the particular API 150-1 may have not included an exhaustive test points to detect such defects, which may be considered as a defect in the source code of the particular API 150-1. In such cases, the API machine learning processor 122 may update the quality value 152-1*a* of the particular API 150-1. In another example, the user 114 may indicate in the tracking ticket 118 that the security mechanism associated with the particular API 150-1 is no longer up to date by comparing the version of the security mechanism and the latest version of the security mechanism available on the Internet. In such cases, the API machine learning processor 122 may update the security value 152-2 of the particular API 150-1. The API machine learning processor 122 may also flag the particular API 150-1 indicating that its security mechanism needs to be updated. In another example, the user 114 may indicate in the tracking ticket 118 that the response time of the particular API 150-1 is different than the determined response time previously reported by the API machine learning processor 122 (e.g., due to differences in task 124 previously performed by the particular API 150-1 via the API machine learning processor 122 and the current task 124 requested by the user 114). In such cases, the API machine learning processor 122 may update the performance value 152-3*a* of the particular API 150-1. Similarly, other tracking tickets 118 are generated and sent to other users 114 when they invoke the particular API 150-1 for their projects. The tracking tickets 118 are sent back to the API machine learning processor 122 for monitoring the particular API 150-1.

The API machine learning processor 122 may also use the information gathered from the tracking tickets 118 to be trained in determining APIs 150 to perform different tasks 124. With this approach, the API machine learning processor 122 gathers a comprehensive training dataset which includes different APIs 150 used for different tasks 124; and how each API 150 has performed in actual projects within the organization. The API machine learning processor 122 may then be trained by such a training dataset to increase the accuracy in evaluating the APIs 150; determining more accurate quality values 152-1, security values 152-2, and performance values 152-3; and recommending a particular API 150 with more accurate API score value 154.

The API machine learning processor 122 may change or update the API score value 154 of the particular API 150 if any of the quality value 152-1, security value 152-2, and performance value 152-3 associated with the particular API 150-1 changes. For example, the quality value 152-1 of the particular API 150 may be changed if at least one portion of the source code of the particular API 150 becomes vulnerable to data leakage, e.g., via cyberattacks, SQL injections, etc. In another example, the security value 152-2 of the particular API 150 may be changed if the security associated with the source code of the particular API 150 is no longer up to date. In another example, the performance value 152-3 of the particular API 150 may be changed if the response time of the particular API 150 performing the particular task 124 changes, for example, because the user 114 has requested to change the output format of the particular API 150; and the particular API 150 is required to account for extra steps to retrieve the requested output with the requested format. More details of the operation of the API machine learning processor 122 are described in conjunction with a method 300 illustrated in FIG. 3.

Source Code Security Scanner

Referring back to FIG. 1, in one embodiment, source code security scanner 128 may be implemented using software instructions 136 executed by the processor 120, and is configured to evaluate the set of APIs 150 and determine the quality and security mechanisms associated with the set of APIs 150. In another embodiment, the source code security scanner 128 may include any appropriate code scanner, such as Code Dx, FXCop, etc. The source code security scanner 128 is configured to access the source codes of the set of APIs 150, stored in a source code repository 134.

For each API 150, the source code security scanner 128 is configured to scan the source code of the API 150 line-by-line and determine the quality associated with each portion of the source code the API 150. The source code security scanner 128 may determine the quality associated with the API 150 based on the qualities associated with different portions of the source code the API 150. In some embodiments, the qualities associated with different portions of the source code of the API 150 may be weighted based on their severity and priority. For example, a first portion of the API 150 may have a higher severity and priority over a second portion of the API 150. Thus, the first portion of the source code of the API 150 may be assigned a higher weight (e.g., 7 out of 10); and the second portion of the source code of the API 150 may be assigned a lower weight (e.g., 3 out of 10). As such, the quality associated with the API 150 may be calculated by the weighted sum of the qualities associates with different portions of the API 150.

In some examples, the quality associated with the API 150 may depend on whether there are vulnerabilities in the source code of the API 150, where the vulnerabilities of the source code of the API 150 includes a portion of the source code from which data leakage is possible. For example, a portion of the source code of the API 150 may indicate that the HTTPS protocol through secure sockets layer (SSL)/transport layer security (TLS) certificates are used to establish a communication between the computing device 102 and the server 106. Using the HTTPS protocol through SSL/TLS certificates instead of HTTP protocols allows encrypted secured connection between the computing device 102 and server 106 which reduces data leakage to a third party. Thus, if the source code security scanner 128 determines that the API 150 includes HTTPS protocols through SSL/TLS certificates, it determines that this portion of the source code of the API 150 is not vulnerable to data leakage.

Some vulnerabilities in the source code of the API 150 may be resolved by parameterizing statements used in the source code of the API 150. For example, consider a first case where the user 114 wishes to retrieve email addresses of clients of the organization. Assume that in the first case, the user 114 uses the below statement to define the query statement in the API 150.

string email="client@mail.com";
string output="SELECT*from clients WHERE email is "'+email+"'"; where this query statement is constructed to return email addresses of the clients of the organization.

However, in this query statement, the email parameter is concatenated with the rest of the query statement with no validation. This method is vulnerable to malicious attacks and SQL injections to intercept the connection between the computing device 102 and the server 106 and access the email addresses of the clients of the organization. Thus, if the source code security scanner 128 determines that the API 150 includes concatenating strings in query statements, it determines that this portion of the source code of the API 150 is vulnerable to data leakage.

Now, consider a second case where the user 114 wishes to retrieve the email addresses of clients of the organization. Assume that in the second case, the user 114 uses the below statement to define the query in the API 150.

string email="client@mail.com";
string output="SELECT*from clients WHERE email is?". In the second case, the email address is parametrized in the query statement, which makes the query statement immune to malicious attacks and SQL injections. Thus, in such cases, the source code security scanner 128 determines that this portion of the source code of the API 150 is not vulnerable to data leakage.

In some examples, the quality associated with the API 150 may depend on a reliability of the source code of the API 150, where the reliability of the source code of the API 150 is represented by the probability that the task 124 will be performed using the API 150 without failure over a specific period of operation. The reliability of the source code of the API 150 is related to the number of defects and availability of the API 150. For example, consider a case where the user may want to retrieve a large data 116. The source code of the API 150 may not be designed to handle a large data 116. Thus, when the user 114 initiates the API request 108, the API request 108 is not sent to the server 106 (because the API 150 is not designed to handle a large data 116). In such cases, the source code security scanner 128 may determine that the quality associated with this portion of the source code of the API 150 is low.

In some examples, the quality associated with the API 150 may depend on a maintainability of the source code of the API 150, where the maintainability of the source code of the API 150 is represented by how easily the API 150 can be maintained. The maintainability of the source code of the API 150 depends on the size, consistency, structure, and complexity of the source code of the API 150. For example, if the source code of the API 150 includes a large number of lines of code, includes inconsistent methods in functions (e.g., styles, headers, etc.), and/or includes complex functions, it would be difficult to maintain the source code of the API 150 and consequently the maintainability of the source code of the API 150 is reduced. Thus, if the source code security scanner 128 determines that the source code of the API 150 includes any of the examples mentioned above, it may determine that the quality associated with the API 150 is low.

In some examples, the quality associated with the API 150 may depend on a testability of the source code of the API 150, where the testability of the source code of the API 150 is represented by how easily potential defects or errors in the source code of the API 150 may be found by test cases and test points. One method that increases the testability of the source code of the API 150 is by implementing classes and methods to define each of the input and output parameters of the API 150. With this approach, if the user 114 wishes to change, e.g., a format of the output parameter of the API 150, he/she may only change the format of the output parameter in its class. Thus, if the source code security scanner 128 determines that classes are used in defining input and output parameters, it may determine that the quality associated with this portion of the source code of the API 150 is high. The testability of the source code of the API 150 may be impacted by the size and the complexity of the source code of the API 150.

In some examples, the quality associated with the API 150 may depend on a portability of the source code of the API 150, where the portability of the source code of the API 150 is represented by whether the API 150 is platform-independent. For example, the portability of the source code of the API 150 is high when the API 150 is programmed to be used on different computing devices 102 with different operating systems and interfaces, such as a laptop with Windows operating system, an iPhone with iOS operating system, a smartphone with Android operating system, etc.

In some examples, the quality associated with the API 150 may depend on a reusability of the source code of the API 150. In one example, the reusability of the source code of the API 150 is represented by whether the classes, methods, function, and/or other portions of the source code of API 150 can be reused in developing other APIs 150 and/or web applications 140. The portions of the source code of API 150 are reusable when they are parametrized (i.e., defined by parameters). In such cases, the source code security scanner 128 may determine that the quality associated with this portion of the source code of the API 150 is high. In another example, the reusability of the source code of the API 150 is represented by whether the API 150 is capable of communicating with different databases 110, such as, SQL, MySQL, Oracle, etc. and retrieving the requested data 116. Thus, if the source code security scanner 128 determines that the API 150 is capable of communicating with different databases 110, it may determine that the quality associated with this portion of the source code of the API 150 is high.

In some examples, the quality associated with the API 150 may depend on how much processing power it consumes to perform the particular task 124. For example, an API 150 may include complex for loops, functions, methods, and/or the like such that memory and CPU utilization of the computing device 102 may indicate that the API 150 consumes a lot of processing power of the computing device 102. In this particular example, the high processing power composition of the API 150 indicates that the API 150 may be associated with a low quality.

The source code security scanner 128 is also configured to scan the source code of the API 150 and determine security information of the security mechanism associated with the API 150, such as type, version, strength, etc. of the security mechanism. In some embodiment, the source code security scanner 128 may assign different values or weights to different security information of the security mechanism associated with the API 150 based on their priorities. For example, the source code security scanner 128 may determine that the strength of the security mechanism associated with the API 150 has a higher priority over the type of the security mechanism. Thus, the source code security scanner 128 may assign a higher value (e.g., 7 out of 10) to the strength of the security mechanism; and assign a lower value (e.g., 2 out of 10) to the type of the security mechanism. As such, the security associated with the API 150 may be determined by calculating a sum of the different values assigned to the security information of the security mechanism associated with the API 150.

In one embodiment. the source code security scanner 128 determines the type of the security mechanism used in the source code of the API 150 by searching for specific keywords such as toke, authentication, authorization, etc. in the source code of the API 150 and finding the functions, classes, methods used to define the security mechanism in the source code of the API 150. For example, the source code security scanner 128 may determine the type of the security mechanism used in an API 150, such as whether it is related to an authorization API (AuthZ API), API Key, Token-based API, two token-based API, etc. In another embodiment, the source code security scanner 128 determines the type of the security mechanism associated with the source code of the API 150 from documentation about the API 150 stored in the source code repository 134.

The source code security scanner 128 may also determine whether the security mechanism of the API 150 is up to date by comparing the version of the security mechanism used in the source code of the API 150 and the latest version of the security mechanism available on the Internet. If the security mechanism of the API 150 is up to date (i.e., its version is the upgraded to its latest version available on the Internet), the source code security scanner 128 determines that the API 150 may be associated with a high security.

The source code security scanner 128 may also determine the strength of the security mechanism of the API 150 based on available known rankings of the security mechanisms on the Internet and/or information available in the source code repository 134. For example, once the source code security scanner 128 determines the type and version of the security mechanism, it may search for its keywords among the ranking of the security mechanisms on the Internet and/or in the source code repository 134 and determine its ranking. For example, a first security mechanism that uses a single token to authorize and authenticate the API request 108 sent by the user 114 may be lower in ranks compared to a second security mechanism that uses two tokens. In another example, a third security mechanism that uses a third-party authentication server to generate tokens may be lower in ranks compared to a fourth security mechanism in which the tokens are generated by the computing device 102 and/or server 106 which are associated with the organization. Once the source code security scanner 128 determines the quality and security information associated with the set of APIs 150 from the source code of the set of APIs 150, it sends this information to the API machine learning processor 122.

In some embodiment, for each API 150 from among the set of APIs 150, the API machine learning processor 122 may determine the quality value 152-1 associated with the API 150 by calculating the weighted sum of the qualities associates with different portions of the source code of the API 150. Similarly, the API machine learning processor 122 may determine the security value 152-2 of the API 150 by calculating the sum of values assigned to the security information of the API 150.

Example of a Method for Determining an API to Perform a Particular Task

Figure 3:
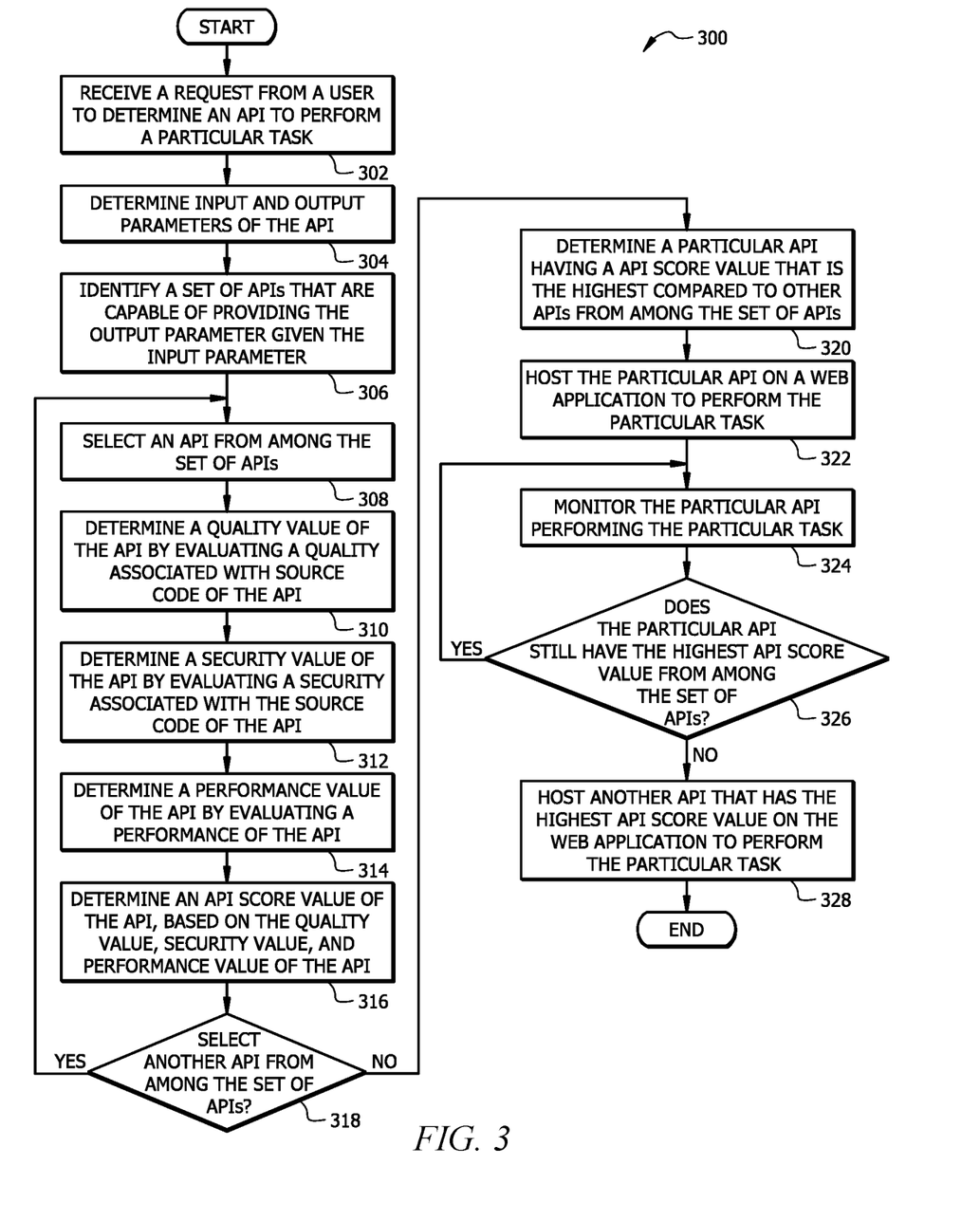
FIG. 3 illustrates an example of a flow chart of a method for determining an API to perform a particular task.

FIG. 3 illustrates a flow chart of a method 300 for determining an API 150 to perform a particular task 124. One or more of steps 302-328 of the method 300 may be implemented, at least in part, in the form of software instructions 136 stored on non-transitory, tangible, machine-readable media (e.g., memory 130) that when run by one or more processors (e.g., processor 120) may cause the one or more processors to perform steps 302-328. In some embodiments, method 300 may be performed on system 100 of FIG. 1, including the computing device 102, processor 120, API machine learning processor 122, source code security scanner 128, and web application 140. Aspects of the steps 302-328 of the method 300 have been covered in the description for FIG. 1; and additional aspects are provided below.

The method 300 begins at step 302 where the API machine learning processor 122 receives a request from the user 114 to determine an API 150 to perform a particular task 124. In some embodiments, the user 114 may specify the request to the API machine learning processor 122 from, for example, a user interface, a command console, etc. of the API machine learning processor 122 as described in FIG. 1. For example, the user 114 may request an API 150 to retrieve email addresses of clients of the organization from client IDs from 100 to 110. The user 114 may specify the input and output parameters of the API 150 by query statements. For example, a query statement for the request above, may be such as: SELECT email from clients WHERE client ID is from 100 to 110. In another example, the user 114 may specify the input and output parameters of the API 150 by feeding them to the API machine learning processor 122 via inputs and outputs fields in its user interface.

In step 304, the API machine learning processor 122 determines input and output parameters of the API 150 specified by the user 114. In some embodiments, the API machine learning processor 122 may determine a plurality of input parameters and a plurality of output parameters associated with the API 150. In the example query statement mentioned above in step 302, the API machine learning processor 122 determines that the input parameter is the client IDs from 100 to 110; and the output parameter is the email addresses of these clients.

In step 306, the API machine learning processor 122 identifies a set of APIs 150 that is capable of providing the output parameter requested by the user 114 given the input parameter. Throughout this process, the API machine learning processor 122 accesses the API library 132 and determines the set of APIs 150 that is capable of providing the output parameter requested by the user 114 given the input parameter, e.g., using the documentations about the set of APIs 150 stored in the API library 132.

In step 308, the API machine learning processor 122 selects an API 150 from among the set of APIs 150 for evaluation. The API machine learning processor 122 iteratively selects an API 150 from among the set of APIs 150 for evaluation.

In step 310, the API machine learning processor 122 determines the quality value 152-1 of the API 150 by evaluating the quality associated with the source code of the API 150. In some embodiments, the API machine learning processor 122 evaluates the quality associated with the source code of the API 150 as described in FIG. 1, where the source code security scanner 128 scans the source code of the API 150 and returns the quality information associated with the source code of the API 150 to the API machine learning processor 122. The API machine learning processor 122 may assign a different quality value 152-1 to the API 150 based on the quality associated with the source code of the API 150, for example, from 1 to 3 or from 1 to 10, where in both examples, 1 is the lowest quality value 152-1 as specified in the API machine learning processor 122. If the API machine learning processor 122 determines that the source code of the API 150 is associated with a low quality, it assigns a low quality value 152-1 (e.g., 1, where 1 is the lowest quality value 152-1) to the API 150. On the other hand, if the API machine learning processor 122 determines that the source code of the API 150 is associated with a high quality, it assigns a high quality value 152-1 (e.g., 3, where 3 is the highest quality value 152-1) to the API 150.

In step 312, the API machine learning processor 122 determines the security value 152-2 of the API 150 by evaluating the security associated with the source code of the API 150. In some embodiments, the API machine learning processor 122 evaluated the security associated with the source code of the API 150 as described in FIG. 1, where the source code security scanner 128 scans the source code of the API 150 and returns the security information associated with the source code of the API 150 to the API machine learning processor 122. The API machine learning processor 122 may assign a different security value 152-2 to the API 150 based on the security associated with the source code of the API 150, for example, from 1 to 3 or 1 to 10, where in both examples, 1 is the lowest security value 152-2 as specified in the API machine learning processor 122. If the API machine learning processor 122 determines that the source code of the API 150 is associated with a low security, it assigns a low security value 152-2 (e.g., 1, where 1 is the lowest security value 152-2) to the API 150. On the other hand, if the API machine learning processor 122 determines that the source code of the API 150 is associated with a high security, it assigns a high security value 152-2 (e.g., 3, where 3 is the highest security value 152-2) to the API 150.

In step 314, the API machine learning processor 122 determines the performance value 152-3 of the API 150 by evaluating the performance associated with the source code of the API 150. In some embodiments, the API machine learning processor 122 evaluates the performance of the API 150 as described in FIG. 1, where the API machine learning processor 122 invokes API 150 to send the API request 108 to server 106 and perform the particular task 124; and determines the response time of the API 150.

For example, assume that the particular task 124 is retrieving data 116 from the server 106. In this example, the API machine learning processor 122 hosts or deploys the API 150 in the web application 140 and sends the API request 108 to the server 106 which specifies to retrieve the data 116 to the computing device 102. The API machine learning processor 122 then determines the response time of the API 150 retrieving the data 116 to the computing device 102.

The API machine learning processor 122 may assign a different performance value 152-3 to the API 150 based on the response time of the API 150 performing the particular task 124, for example, from 1 to 3 or 1 to 10, where in both examples, 1 is the lowest performance value 152-3 as specified by the API machine learning processor 122.

The API machine learning processor 122 may assign the performance values 152-3 to the APIs 150 after it determines and compares the response times of the set of APIs 150 with each other. If the API machine learning processor 122 determines that the response time of the API 150 is longest compared to other APIs 150, it assigns a low performance value 152-3 (e.g., 1, where 1 is the lowest performance value 152-3) to the API 150. On the other hand, if the API machine learning processor 122 determines that the response time of the API 150 is shortest compared to other APIs 150, it assigns a high performance value 152-3 (e.g., 1, where 3 is the lowest performance value 152-3) to the API 150.

In step 316, the API machine learning processor 122 determines the API score value 154 of the API 150 based on the combination of the quality value 152-1, security value 152-2, and performance value 152-3. In some embodiments, the API machine learning processor 122 determines the API score value 154 by calculating the sum of the quality value 152-1, security value 152-2, and performance value 152-3 assigned to the API 150. For example, if the quality value 152-1, security value 152-2, and performance value 152-3 assigned to the API 150 are 1, 3, and 3, respectively, the API score value 154 of the API 150 will be 7.

In step 318, the API machine learning processor 122 determines whether to select another API 150. Here, the API machine learning processor 122 determines whether all of the APIs 150 from among the set of APIs 150 have been evaluated. The API machine learning processor 122 determines to select another API 150 when at least one API 150 from among the set of APIs 150 has not yet been evaluated. If the API machine learning processor 122 determines that at least one API 150 from among the set of APIs 150 has not yet been evaluated, the method 300 returns to step 308 where the API machine learning processor 122 selects another API 150 from among the set of APIs 150 for evaluation. Otherwise, the method 300 proceeds to step 320.

In step 320, the API machine learning processor 122 determines a particular API 150-1 that has the highest API score value 154 compared to other APIs 150 from the set of APIs 150. Throughout this process, the API machine learning processor 122 compares the API score values 154 associated with the APIs 150 and determines the particular API 150-1 from among the set of APIs 150 that has the highest API score value 154-1 compared to other APIs 150 from among the set of APIs 150.

For example, assume that for a first API 150-1, a first quality value 152-1a, a first security value 152-2a, and a first performance value 152-3a assigned to the first API 150-1 are 1, 3, and 3, respectively. Thus, the first API score value 154-1 associated with the first API 150-1 will be 7. Also assume that for a second API 150-2, a second quality value 152-1b, a second security value 152-2b, and a second performance value 152-3b assigned to the second API 150-2 are 1, 1, and 3, respectively. Thus, the second API score value 154-2 associated with the second API 150-2 will be 5. In this example, the API machine learning processor 122 compares the first API score value 154-1 and the second API score value 154-2; and determines that the first API score value 154-1 is higher than the second API score value 154-2.

In step 322, the API machine learning processor 122 hosts or deploys the particular API 150-1 with the highest API score value 154-1 in the web application 140 to perform the particular task 124 as described in FIG. 1. Continuing the example in step 320, once the API machine learning processor 122 determined that the first API 150-1 has the higher API score value 154-1 than the second API 150-2, it hosts the first API 150-1 in the web application 140 to perform the particular task 124.

In step 324, the API machine learning processor 122 monitors the particular API 150-1 performing the particular task 124, e.g., by generating a tracking ticket 118 as described in FIG. 1. The API machine learning processor 122 generates a separate tracking ticket 118 every time a different user 114 invokes the particular API 150-1 to perform the particular task 124. In this process, the API machine learning processor 122 gathers comprehensive information regarding how the particular API 150-1 has performed in actual projects requested by the users 114. The API machine learning processor 122 uses this information as a training dataset in determining more accurate API score values 154 and recommending an API 150 with a better quality, security, and performance compared to other APIs 150 from among the set of APIs 150 to perform the particular task 124.

In step 326, the API machine learning processor 122 determines whether the API score value 154 associated with the particular API 150-1 is remained the highest from among the set of APIs 150 based on the monitoring of the particular API 150-1 and/or the feedbacks of the users 114 from the tracking tickets 118. If the API machine learning processor 122 determines that the API score value 154-1 associated with the particular API 150-1 is still the highest from among the set of APIs 150, the method 300 returns to step 324 where the API machine learning processor 122 continues to monitor the particular API 150-1. If the API machine learning processor 122 determines that the API score value 154-1 associated with the particular API 150-1 no longer is the highest from among the set of APIs 150, the method 300 proceeds to step 328.

In step 328, the API machine learning processor 122 hosts another API 150 that has the highest API score value 154 from among the set of APIs 150. For example, consider a case where the API score value 154-1 associated with the particular API 150-1 has been determined to be 7 to perform the particular task 124 in step 316. For this particular example, assume that the particular API 150-1 had the highest API score value 154-1 from among the set of APIs 150 as determined by the API machine learning processor 122. Thus, the API machine learning processor 122 recommends to the user 114 to use this particular API 150-1 to perform the particular task 124.

After a while, when the user 114 uses the particular API 150-1 for a few times, he/she may notice that a newer version of the security mechanism associated with the source code of the particular API 150-1 is now available on the Internet. Thus, the user 114 may indicate in the tracking ticket 118 that the security mechanism associated with the source code of the particular API 150-1 is no longer up to date. The API machine learning processor 122 then recommends another API 150 that has the highest API score value 154 to be hosted or deployed in the web application 140 to perform the particular task 124. The API machine learning processor 122 also updates the security value 152-2a associated with the particular API 150-1 based on the feedback of the user 114 in the tracking ticket 118. The API machine learning processor 122 may also flag the particular API 150-1 indicating that its security mechanism needs to be updated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for determining an application programming interface (API) to perform a particular task, comprising:
   a memory operable to store an API library comprising a plurality of APIs;
   a processor operably coupled to the memory, configured to:
      receive a request from a user to determine an API to perform the particular task, wherein the particular task comprises retrieving data from a server;
      determine a set of parameters of the API, wherein the set of parameters comprises an input parameter and an output parameter of the API;

identify a set of APIs from the API library that are capable of providing the output parameter given the input parameter;
evaluate each API from among the set of APIs by:
determining a quality value of the API by evaluating a quality associated with source code of the API;
determining a security value of the API by evaluating a security associated with the source code of the API;
determining a performance value of the API by evaluating a performance of the API; and
determining an API score value based at least in part upon a combination of the quality value, the security value, and the performance value of the API;
based on evaluating each API from among the set of APIs, determine a particular API having an API score value that is the highest compared to other APIs from among the set of APIs; and
host the particular API on a web application to perform the particular task.

2. The system of claim 1, wherein evaluating the quality associated with the source code of the particular API comprises:
determining whether there are any vulnerabilities in the source code of the particular API, wherein the vulnerabilities of the source code of the particular API comprises a portion of the source code from which data leakage is possible; and
in response to determining that there are no vulnerabilities in the source code of the particular API, determining that the particular API has a high quality value.

3. The system of claim 1, wherein evaluating the security associated with the source code of the particular API comprises:
determining a security mechanism used in the source code of the particular API;
determining whether the security mechanism used in the source code of the particular API is up to date; and
in response to determining that the security mechanism used in the source code of the particular API is up to date, determining that the particular API has a high security value.

4. The system of claim 1, wherein evaluating the performance of the particular API comprises:
hosting the particular API in the web application;
determining a response time of the particular API while the web application is performing the particular task; and
if the particular API has the shortest response time from among the set of APIs, determining that the particular API has a high performance value.

5. The system of claim 1, wherein the processor is further configured to:
change the API score value of the particular API if any of the quality value, the security value, and the performance value associated with the particular API changes, wherein:
the quality value of the particular API changes if at least one portion of source code of the particular API becomes vulnerable to data leakage,
the security value of the particular API changes if the security associated with the source code of the particular API is no longer up to date, and
the performance value of the particular API changes if a response time of the particular API performing the particular task changes.

6. The system of claim 1, wherein the processor is further configured to:
monitor the particular API hosted in the web application by generating a tracking ticket that comprises a survey to track the quality, security, and performance associated with the particular API;
based on monitoring results, determine whether the particular API hosted in the web application no longer has the highest API score value among the set of APIs; and
in response to a determination that the particular API hosted in the web application no longer has the highest API score value among the set of APIs, host another API having an API score value that is the highest API score value compared to other APIs from among the set of APIs in the web application to perform the particular task.

7. The system of claim 1, wherein the quality associated with the source code of the particular API depends on a reliability, a maintainability, a testability, a portability, and a reusability associated with the source code of the particular API.

8. A method for determining an application programming interface (API) to perform a particular task, comprising:
receiving a request from a user to determine an API to perform the particular task, wherein the particular task comprises retrieving data from a server;
determining a set of parameters of the API, wherein the set of parameters comprises an input parameter and an output parameter of the API;
identifying a set of APIs from an API library that are capable of providing the output parameter given the input parameter;
evaluating each API from among the set of APIs by:
determining a quality value of the API by evaluating a quality associated with source code of the API;
determining a security value of the API by evaluating a security associated with the source code of the API;
determining a performance value of the API by evaluating a performance of the API; and
determining an API score value based at least in part upon a combination of the quality value, the security value, and the performance value of the API;
based on evaluating each API from among the set of APIs, determining a particular API having an API score value that is the highest compared to other APIs from among the set of APIs; and
host the particular API in a web application to perform the particular task.

9. The method of claim 8, wherein evaluating the quality associated with the source code of the particular API comprises:
determining whether there are any vulnerabilities in the source code of the particular API, wherein the vulnerabilities of the source code of the particular API comprises a portion of the source code from which data leakage is possible; and
in response to determining that there are no vulnerabilities in the source code of the particular API, determining that the particular API has a high quality value.

10. The method of claim 8, wherein evaluating the security associated with the source code of the particular API comprises:
determining a security mechanism used in the source code of the particular API;
determining whether the security mechanism used in the source code of the particular API is up to date; and in response to determining that the security mechanism used in the source code of the particular API is up to date, determining that the particular API has a high security value.

11. The method of claim 8, wherein evaluating the performance of the particular API comprises:
hosting the particular API in the web application;
determining a response time of the particular API while the web application is performing the particular task; and
if the particular API has the shortest response time from among the set of APIs, determining that the particular API has a high performance value.

12. The method of claim 8, wherein the method further comprises:
changing the API score value of the particular API if any of the quality value, the security value, and the performance value associated with the particular API changes, wherein:
the quality value of the particular API changes if at least one portion of source code of the particular API becomes vulnerable to data leakage,
the security value of the particular API changes if the security associated with the source code of the particular API is no longer up to date, and
the performance value of the particular API changes if a response time of the particular API performing the particular task changes.

13. The method of claim 8, wherein the method further comprises:
monitoring the particular API hosted in the web application by generating a tracking ticket that comprises a survey to track the quality, security, and performance associated with the particular API;
based on monitoring results, determining whether the particular API hosted in the web application no longer has the highest API score value among the set of APIs; and
in response to a determination that the particular API hosted in the web application no longer has the highest API score value among the set of APIs, hosting another API having an API score value that is the highest API score value compared to other APIs from among the set of APIs in the web application to perform the particular task.

14. The method of claim 8, wherein the quality associated with the source code of the particular API depends on a reliability, a maintainability, a testability, a portability, and a reusability associated with the source code of the particular API.

15. A computer program comprising executable instructions stored in a non-transitory computer-readable medium that when executed by a processor causes the processor to:
receive a request from a user to determine an API to perform a particular task, wherein the particular task comprises retrieving data from a server;
determine a set of parameters of the API, wherein the set of parameters comprises an input parameter and an output parameter of the API;
identify a set of APIs from an API library that are capable of providing the output parameter given the input parameter;
evaluate each API from among the set of APIs by:
determining a quality value of the API by evaluating a quality associated with source code of the API;
determining a security value of the API by evaluating a security associated with the source code of the API;
determining a performance value of the API by evaluating a performance of the API; and
determining an API score value based at least in part upon a combination of the quality value, the security value, and the performance value of the API;
based on evaluating each API from among the set of APIs, determine a particular API having an API score value that is the highest compared to other APIs from among the set of APIs; and
host the particular API on a web application to perform the particular task.

16. The computer program of claim 15, wherein evaluating the quality associated with the source code of the particular API comprises:
determining whether there are any vulnerabilities in the source code of the particular API, wherein the vulnerabilities of the source code of the particular API comprises a portion of the source code from which data leakage is possible; and
in response to determining that there are no vulnerabilities in the source code of the particular API, determining that the particular API has a high quality value.

17. The computer program of claim 15, wherein evaluating the security associated with the source code of the particular API comprises:
determining a security mechanism used in the source code of the particular API;
determining whether the security mechanism used in the source code of the particular API is up to date; and
in response to determining that the security mechanism used in the source code of the particular API is up to date, determining that the particular API has a high security value.

18. The computer program of claim 15, wherein evaluating the performance of the particular API comprises:
hosting the particular API in the web application;
determining a response time of the particular API while the web application is performing the particular task; and
if the particular API has the shortest response time from among the set of APIs, determining that the particular API has a high performance value.

19. The computer program of claim 15, wherein the processor is further configured to:
change the API score value of the particular API if any of the quality value, the security value, and the performance value associated with the particular API changes, wherein:
the quality value of the particular API changes if at least one portion of source code of the particular API becomes vulnerable to data leakage,
the security value of the particular API changes if the security associated with the source code of the particular API is no longer up to date, and
the performance value of the particular API changes if a response time of the particular API performing the particular task changes.

20. The computer program of claim 15, wherein the processor is further configured to:
monitor the particular API hosted in the web application by generating a tracking ticket that comprises a survey to track the quality, security, and performance associated with the particular API;
based on monitoring results, determine whether the particular API hosted in the web application no longer has the highest API score value among the set of APIs; and in response to a determination that the particular API hosted in the web application no longer has the highest API score value among the set of APIs, host another API having an API score value that is the highest API score value compared to other APIs from among the set of APIs in the web application to perform the particular task.

\* \* \* \* \*